United States Patent
Hauser et al.

(10) Patent No.: US 7,085,373 B2
(45) Date of Patent: Aug. 1, 2006

(54) CIRCUIT AND METHOD FOR DETECTING AC VOLTAGE PULSES

(75) Inventors: Thomas Hauser, München (DE); Frank Hürtgen, Düsseldorf (DE); Christian Kranz, Ratingen Lintorf (DE)

(73) Assignee: Infineon Technologies AG, Munich (DE)

(*) Notice: Subject to any disclaimer, the term of this patent is extended or adjusted under 35 U.S.C. 154(b) by 189 days.

(21) Appl. No.: 10/431,901

(22) Filed: May 8, 2003

(65) Prior Publication Data

US 2003/0207677 A1 Nov. 6, 2003

Related U.S. Application Data

(63) Continuation of application No. PCT/DE01/03890, filed on Oct. 11, 2001.

(30) Foreign Application Priority Data

Nov. 8, 2000 (DE) .............................. 100 55 375

(51) Int. Cl.
    *H04M 1/00* (2006.01)
(52) U.S. Cl. .................. 379/399.01; 379/382
(58) Field of Classification Search .......... 379/399.01, 379/418, 387
    See application file for complete search history.

(56) References Cited

U.S. PATENT DOCUMENTS

| | | | |
|---|---|---|---|
| 4,479,188 A | 10/1984 | de Keijzer | |
| 4,617,427 A | 10/1986 | Vea et al. | |
| 4,698,769 A | 10/1987 | McPherson et al. | |
| 5,111,161 A | 5/1992 | Sato | |
| 5,675,498 A | 10/1997 | White | |
| 6,067,329 A * | 5/2000 | Kato et al. ............... | 375/321 |

FOREIGN PATENT DOCUMENTS

| | | |
|---|---|---|
| JP | 62-501669 | 7/1987 |
| JP | 3-270592 | 12/1991 |
| JP | 4-220862 | 8/1992 |
| JP | 10-70580 | 3/1998 |

* cited by examiner

*Primary Examiner*—Jefferey F. Harold
(74) *Attorney, Agent, or Firm*—Laurence A. Greenberg; Werner H. Stemer; Ralph E. Locher

(57) ABSTRACT

A detection circuit and method for detecting AC voltage pulses at a defined frequency relate to first transforming an input signal to a low-frequency signal by multiplying the input signal by a mixing frequency. This down-mixed signal can then be filtered and evaluated. The circuit is particularly suitable for identifying charge unit signals in the telephone network.

17 Claims, 1 Drawing Sheet

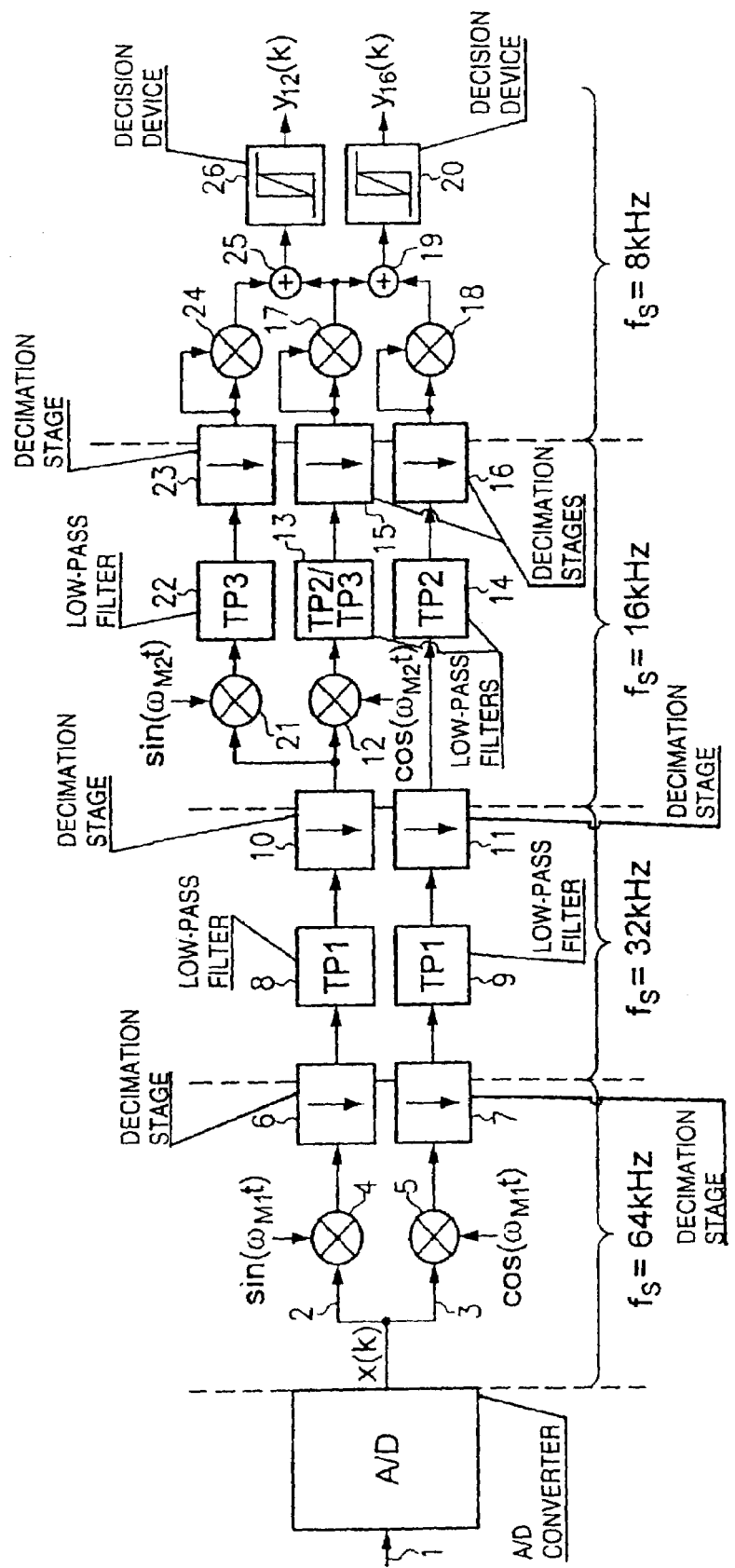

CIRCUIT AND METHOD FOR DETECTING AC VOLTAGE PULSES

CROSS-REFERENCE TO RELATED APPLICATION

This application is a continuation of copending International Application No. PCT/DE01/03890, filed Oct. 11, 2001, which designated the United States and was not published in English.

BACKGROUND OF THE INVENTION

Field of the Invention

The invention relates to a circuit for detecting AC voltage pulses at a defined frequency, to a telephone having such a circuit, and to a method for identifying AC voltage pulses at a defined frequency.

In the European analog telephone network, charge unit pulses are transmitted to the subscriber terminals, in order to allow the accumulating charges to be detected at the subscriber end. The charge unit pulses are short AC voltage pulses at a frequency of 16 kHz, or in some countries at about 12 kHz. These charge pulses must be identified and counted in the subscriber device.

Originally, the charge unit signals were output from the reception path by a bandpass filter, and were supplied to a mechanical meter, which was incremented by one step for each pulse. More recent solutions provide for the charge unit signals to be output from the reception path which is provided for audio signal processing, and to be filtered by a bandpass filter. The charge unit signals are then converted by a comparator to square-wave signals, whose period duration is determined digitally by a counter. If the digitally detected length of the charge pulse is within a predefined tolerance band, a charge pulse is registered.

This solution has the disadvantage of requiring a relatively large number of discrete components for outputting and bandpass filtering the charge unit signals. Discrete components are expensive and impede further miniaturization of the subscriber terminals.

SUMMARY OF THE INVENTION

It is accordingly an object of the invention to provide a circuit for detecting AC voltage pulses at a defined frequency, a telephone having such a circuit, and a method for identifying AC voltage pulses at a defined frequency, which overcome the above-mentioned disadvantages of the prior art apparatus and methods of this general type.

In particular, it is an object of the invention to further reduce the number of discrete components required to detect AC voltage pulses at a defined frequency.

With the foregoing and other objects in view there is provided, in accordance with the invention, a circuit for detecting AC voltage pulses at a defined frequency. The circuit includes: an analog/digital converter unit for converting an input signal to a sequence of sample values; at least one mixing stage for multiplying the sequence of sample values by a mixing frequency signal; at least one filter stage for defining a permissible intermediate frequency band and for obtaining converted sample values by filtering the sequence of sample values having been multiplied by the mixing signal; and an evaluation unit for determining whether an AC voltage pulse is present by using the converted sample values.

The detection circuit has an analog/digital converter unit for converting the input signal to a sequence of sample values. The sequence of sample values is multiplied by a mixing frequency signal using at least one mixing stage. Furthermore, the detection circuit has at least one filter stage for defining the permissible intermediate frequency band. The converted sample values are used by an evaluation unit to determine whether an AC voltage pulse is present.

In contrast to the situation in the prior art, the incoming AC voltage pulse is first of all digitized; the rest of the processing is then carried out in digital form. Both the mixing stage or the mixing stages and the filter stage or the filter stages are in the form of digital circuits or a digital signal processor.

The superheterodyne principle is used in order to allow frequency-specific detection of AC voltage pulses. This is done by multiplying the sample values of the input signal by a mixing frequency signal at the frequency $\omega_M$. An AC voltage pulse at the frequency $\omega_0$ is thus on the one hand up-mixed to the frequency $\omega_0+\omega_M$, and on the other hand is down-mixed to the frequency $\omega_0-\omega_M$. A downstream filter stage defines the permissible intermediate frequency band and thus the tolerance band for the frequency of the AC voltage pulse. For example, the up-mixed component $\omega_0+\omega_M$ can be suppressed by a low-pass filter.

A low-pass filter can also be used to define the permissible intermediate frequency band for the down-mixed component $\omega_0-\omega_M$, because $|\omega_0-\omega_M|\leq\omega_G$ and thus $\omega_M-\omega_G\leq\omega_0\leq\omega_M+\omega_G$ at a cut-off frequency $\omega_G$. Instead of a low-pass filter, a filter with a different characteristic, for example, a bandpass filter, may also be used to define the permissible intermediate frequency band.

The AC voltage signal to be detected is thus first of all down-mixed to the intermediate frequency band, and the frequency band within which AC voltage pulses are intended to be detected is then defined by limiting the intermediate frequency band. The evaluation unit then uses the converted sample values to determine whether an AC voltage pulse has occurred in the frequency window defined in this way.

The use of the superheterodyne principle for detecting AC voltage pulses at a defined frequency means that there is no need for filter arrangements with discrete components. The signal processing is carried out completely digitally and can be carried out by digital signal processors, thus allowing the evaluation circuit to be implemented in a space-saving and cost-effective manner.

According to one advantageous embodiment of the invention, the circuit for detecting AC voltage pulses has at least one decimation stage, which reduces the signal rate by omitting sample values. Decimation stages such as these allow the sampling rate for the sample values to be reduced in steps; the actual signal processing can then be carried out at a lower sampling frequency. More processing time is thus available for signal processing for each sample value, and the requirements for the performance of the digital signal processor or of the digital evaluation circuit can therefore be made less stringent. A further advantage of a low processing frequency is that the power consumption of the DSP or of the evaluation circuit is reduced.

A further advantageous embodiment of the invention provides for the mixing stage or the mixing stages each to have a quadrature signal path and an in-phase signal path. The sequence of sample values is multiplied by the sine signal at the mixing frequency in the quadrature signal path, and the sequence of sample values is multiplied by the cosine signal at the mixing frequency in the in-phase signal path.

The cosine signal of the mixing frequency, which is used in the in-phase signal path, is phase-shifted through 90° relative to the sine signal which is used in the quadrature signal path. An AC voltage signal which is applied to the input of the evaluation circuit can thus be processed irrespective of its phase angle relative to the mixing frequency signal. Either the quadrature signal path or the in-phase signal path produces the stronger signal, depending on the phase angle of the input signal.

In this case, it is particularly advantageous for the multiplication by the sine signal at the mixing frequency to be carried out by multiplying the sequence of sample values by the sequence 0, 1, 0, −1, 0 . . . . This value sequence corresponds to the profile of the sine signal at the mixing frequency in the situation where four times the mixing frequency is chosen as the sampling frequency. If the mixing frequency is 16 kHz, the sampling frequency must therefore be chosen to be 64 kHz. The multiplication of the sequence of sample values by the sequence 0, 1, 0, −1, 0 . . . can be carried out in a simple manner by every alternate sample value being set to zero and every fourth sample value being inverted. The multiplication of the sequence of sample values by the sequence 0, 1, 0, −1, 0 . . . can be linked in a simple manner to a decimation step, by first of all omitting every alternate sample value. Every alternate sample value of the remaining sample values is then inverted.

In a corresponding manner the multiplication by the cosine signal at the mixing frequency can be carried out by multiplying the sequence of sample values by the sequence 1, 0, −1, 0, 1, . . . , if the sampling frequency is four times as great as the mixing frequency. This takes account of the 90° phase shift between the sine signal and the cosine signal.

It is advantageous for the evaluation unit to in each case square, add and compare with a threshold value, the converted sample values in the quadrature signal path and in the in-phase signal path. Once the AC voltage pulse has passed through the various mixing and filter stages, the square of the magnitude of the signal can be obtained by squaring and adding the converted sample values from the quadrature signal path and from the in-phase signal path. The splitting of the signal path into a quadrature signal path and an in-phase signal path always results in the same square of the magnitude irrespective of the phase angle of the input signal relative to the mixing signal.

In the situation where the AC voltage pulse is within the permissible tolerance band and passes through the various mixing and filter stages, the threshold value which is defined in the evaluation unit is exceeded, which means that an AC voltage pulse of a specific type has been received. If, on the other hand, the frequency of the AC voltage pulse is not within the predefined frequency window, then the signal is so severely attenuated by the mixing and filter stages that the square of the magnitude of the signal is below the threshold value.

It is advantageous for the mixing stage to multiply the sequence of sample values by a mixing frequency signal whose frequency corresponds to the frequency of the AC voltage pulses to be detected. The mixing frequency signal $\omega_M$ results in an AC voltage pulse at the frequency $\omega_0$ being down-mixed to the frequency $\omega_0-\omega_M$. If the frequency of the mixing signal corresponds to the frequency of the AC voltage pulses to be detected, then the AC voltage signal which is present initially is down-mixed to 0 Hz, or to a very low frequency.

This down-mixed signal can be processed more easily than the original relatively high-frequency signal. In accordance with the Nyquist theorem, the down-mixed signal can be detected using relatively low sampling rates. The down-mixing of the input signal thus allows the sampling frequency to be reduced. A further advantage is that the down-mixed, low-frequency signal can be band-limited by using a low-pass filter stage, in order in this way to define the permissible frequency window for the AC voltage signal which was present initially. This frequency window extends from $\omega_M-\omega_G$ to $\omega_M+\omega_G$ where $\omega_M$ is the mixing frequency and $\omega_G$ is the cut-off frequency of the low-pass filter.

According to a further advantageous embodiment of the invention, the circuit has a first mixing stage which multiplies the sequence of sample values by a first mixing frequency signal having a frequency corresponding to the frequency of a first type of AC voltage pulses. Furthermore, the circuit has a second mixing stage, which is arranged between the first mixing stage and the evaluation unit, and which multiplies the sequence of sample values by a second mixing frequency signal. The frequency of the second mixing frequency signal corresponds to the difference between the frequencies of the first type and of a second type of AC voltage pulses.

An AC voltage pulse of the first type which is applied to the input is down-mixed by the first mixing stage to a frequency of 0 Hz, or to a very low frequency, and can then be processed further by a first detection path. If, however, an AC voltage pulse of the second type is applied to the input of the first mixing stage, then this AC voltage pulse is down-mixed to a frequency which corresponds to the difference frequency between the first and the second type of AC voltage pulses. This signal is supplied to the downstream second mixing stage, whose mixing frequency corresponds precisely to this difference frequency. The second mixing stage then down-mixes the applied difference frequency signal to 0 Hz or to a very low frequency. The signal which is produced at the output of the second mixing stage is processed further by the second detection path. Filter stages can be arranged both in the first detection path (for the first type of AC voltage pulses) and in the second detection path (for the second type of AC voltage pulses) in order in each case to define the permissible frequency bands for the first type and for the second type of AC voltage pulses.

It is particularly advantageous for a low-pass filter stage whose cut-off frequency is above the difference frequency to be arranged between the first mixing stage and the second mixing stage. Not only the down-mixed signal $\omega_0-\omega_M$, but also an up-mixed signal at the frequency $\omega_0+\omega_M$ are produced at the output of the second mixing stage. The low-pass filter stage, which is arranged between the first mixing stage and the second mixing stage, suppresses this up-mixed signal component, since it is not required for the further signal processing.

It is particularly advantageous for the circuit to be used for detecting charge unit signals in the telephone network. The charge unit signals are short AC voltage pulses at a defined frequency of about 16 kHz, or in some countries at about 12 kHz. If the detection circuit is designed exclusively for processing 16 kHz pulses, then a single mixing stage with a mixing frequency of 16 kHz is sufficient to down-mix the input signal to low frequencies. In a corresponding way, a mixing stage which operates at a mixing frequency of 12 kHz is sufficient for detecting 12 kHz pulses. If, on the other hand, a single detection circuit is intended to be used to detect both 12 kHz and 16 kHz pulses, then the input signal can first of all be down-mixed by a first mixing stage, which is operated at a mixing frequency of 16 kHz, to 0 Hz (when the signal is at 16 kHz), or to 4 kHz (when the signal is as 12 kHz). The 16 kHz signal which has been down-mixed to 0 Hz can be evaluated immediately. The 12 kHz signal which has been down-mixed to 4 kHz can likewise be down-mixed to 0 Hz by a second mixing stage, which is operated at a mixing frequency of 4 kHz, and can then be evaluated.

The detection circuit for AC voltage pulses at a defined frequency is particularly suitable for being used in a telephone, in order to detect the charge unit signals that are transmitted via the telephone network. A telephone that is equipped with the detection circuit can be matched to all the charge unit signal standards that are used in Europe. The production costs are in this case lower than for previous solutions.

In this case, it is particularly advantageous for the charge unit signals to be detected via the speech path, via which the audio signal processing is also carried out. In contrast to the situation with previous solutions, there is no need to output the charge unit pulses from the speech path, and filter arrangements with discrete components are superfluous for the inventive solution.

In particular, it is advantageous for the charge unit signals to be digitized by the analog/digital converter unit in the speech path. Modern telephones have an analog/digital converter unit, which converts the incoming audio signal to digital sample values. In the inventive solution, this analog/digital converter unit also carries out the task of digitizing the incoming charge unit signals. No separate analog/digital converter module is therefore required for the analog/digital conversion of the charge unit signals.

It is particularly advantageous for the various processing stages for converting the sequence of sample values to be in the form of one or more digital signal processors. The mixing stages, filter stages and decimation stages which are required for evaluating the charge unit signals may be formed completely by digital signal processors. A digital signal processor can also be used for the evaluation unit in which the sample values are squared and added.

With the foregoing and other objects in view there is provided, in accordance with the invention, a telephone portion including a circuit for detecting charge unit signals at a defined frequency. The circuit includes: an analog/digital converter unit for converting an input signal to a sequence of sample values; at least one mixing stage for multiplying the sequence of sample values by a mixing frequency signal; at least one filter stage for defining a permissible intermediate frequency band and for obtaining converted sample values by filtering the sequence of sample values having been multiplied by the mixing signal; and an evaluation unit for determining whether a charge unit signal is present by using the converted sample values.

In accordance with an added feature of the invention, a speech path is provided via which audio signal processing is performed; and the charge unit signals are detected via the speech path.

In accordance with an additional feature of the invention, the analog/digital converter unit is configured in the speech path; and the charge unit signals are digitized by the analog/digital converter unit.

In accordance with another feature of the invention, at least one digital signal processor is provided for implementing at least the mixing stage and the filter stage.

With the foregoing and other objects in view there is provided, in accordance with the invention, a method for identifying different types of AC voltage pulses each having a defined frequency. The method includes steps of: digitizing an input signal to form a sequence of digitized sample values; obtaining a sequence of converted sample values by converting the sequence of sample values using any desired sequence of steps including multiplying the sequence of sample values by predetermined mixing frequency signals and filtering the sequence of sample values to define a permissible intermediate frequency band; and using the sequence of converted sample values to determine whether a specific type of AC voltage pulse is present.

In accordance with an added feature of the invention, the method includes, while performing the step of converting the sequence of sample values, reducing a signal rate by reducing a number of the sample values in the sequence of sample values.

In accordance with an additional feature of the invention, the step of determining whether a specific type of AC voltage pulse is present includes squaring, adding and comparing the sequence of converted sample values with a threshold value.

In accordance with another feature of the invention, the step of multiplying the sequence of sample values by predetermined mixing frequency signals includes multiplying the sequence of sample values by a mixing frequency signal having a frequency corresponding to a frequency of the AC voltage pulses being identified.

In accordance with a further feature of the invention, the step of multiplying the sequence of sample values by predetermined mixing frequency signals includes first multiplying the sequence of sample values by a first mixing frequency signal having a frequency corresponding to a frequency of a first type of AC voltage pulses, and subsequently multiplying the sequence of sample values by a second mixing frequency signal having a frequency corresponding to a difference between the frequency of the first type of AC voltage pulses and a frequency of a second type of AC voltage pulses.

In accordance with a further added feature of the invention, the AC voltage pulses are charge unit signals in a telephone network.

In the method for identifying different types of AC voltage pulses, each at a defined frequency, the input signal is digitized in a first step. The sequence of digitized sample values obtained in this way is then converted by carrying out various steps including the multiplication of the sequence of sample values by predetermined mixing frequency signals and filtering the sequence of sample values. The permissible intermediate frequency band is defined by filtering the sequence of sample values. It is then possible to use the sequence of converted sample values to determine whether a specific type of AC voltage pulse is present.

The inventive method allows completely digital selective identification of various types of AC voltage pulses. In the method, the input signal is down-mixed to low frequencies by being multiplied by different mixing frequency signals. First, this has the advantage that the signal can be filtered considerably more easily in the low-frequency intermediate frequency band than in the original input signal frequency band. A further advantage is that it is possible to use considerably lower signal rates once the input signal has been transformed to the low-frequency band. This means that less powerful signal processors can be used and that the power consumption of the circuit is reduced.

Other features which are considered as characteristic for the invention are set forth in the appended claims.

Although the invention is illustrated and described herein as embodied in an evaluation circuit for AC voltage pulses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The sole drawing FIGURE shows a detection circuit that can detect both 16 kHz and 12 kHz charge unit signals.

DESCRIPTION OF THE PREFERRED EMBODIMENTS

Referring now to the sole drawing FIGURE, there is shown a detection circuit for detecting AC voltage pulses at a defined frequency. This detection circuit is particularly suitable for detecting the charge unit signals that are transmitted via the telephone network. The circuit and the detection principle are not, however, restricted to this application, but can be used wherever identification pulses at a defined frequency should be selectively detected.

The analog input signal 1 is first of all supplied to the analog/digital converter A/D and is converted to a sequence of digital sample values x(k). If the circuit in a telephone is used for detecting the charge unit pulses, then the charge unit signals are digitized by the same analog/digital converter that is also used to convert the speech signal to digital values, because the charge unit pulses are not output from the speech path in this inventive solution.

The digitized sample values x(k) are now supplied to the first mixing stage, and for this purpose are split into a quadrature signal path 2 and an in-phase signal path 3. In the mixer 4 for the quadrature signal path, the signal is multiplied by the sine signal $\sin(\omega_{M1} \cdot t)$ at the mixing frequency $\omega_{M1}$, where $\omega_{M1}$ is chosen to be $$\frac{1}{2\pi} \cdot 16$$

kHz, thus corresponding to the frequency of the 16 kHz charge unit pulses.

In the mixer 5 for the in-phase signal path, the signal is multiplied by the cosine signal $\cos(\omega_{M1} \cdot t)$ at the mixing frequency $$\omega_{M1} = \frac{1}{2\pi} \cdot 16$$

kHz, that is to say by a mixing signal which has been phase-shifted through 90°. The charge unit pulses can therefore be detected independently of their phase angle relative to the mixing frequency signals.

The signal rate at the output of the analog/digital converter and in the mixers 4 and 5 is 64 kHz and is therefore four times the mixing frequency $f_{M1}$. Sampling is therefore carried out four times in each clock cycle of the mixing frequency, therefore resulting in the sequence 0, 1, 0, −1, 0, . . .

$$\left(\sin\left(\frac{\pi \cdot k}{2}\right), \text{ where } k = 0, 1, 2, \ldots\right)$$

as the sine signal at the mixing frequency. In a corresponding manner, the sequence 1, 0, −1, 0, 1, . . .

$$\left(\cos\left(\frac{\pi \cdot k}{2}\right), \text{ where } k = 0, 1, 2, \ldots\right)$$

is obtained for the cosine signal at the mixing frequency. The multiplication of the input signal by the sine sequence in the mixer 4 thus results in a signal sequence in which every alternate value is set to be equal to zero. A signal sequence in which every alternate value is equal to zero is also produced at the output of the mixer 5 of the in-phase signal path. In the subsequent decimation stages 6 and 7, the signal rate is in each case reduced from $f_S$=64 kHz to $f_S$=32 kHz, by omitting those values which have been set to zero in the signal sequence.

An up-mixed signal in each case appears at the outputs of the mixers 4 and 5, whose frequency corresponds to the sum of the frequencies of the input signal and of the mixing signal, as well as a down-mixed signal whose frequency corresponds to the difference frequency between the input signal and the mixing signal. A 16 kHz pulse is on the one hand up-mixed to 32 kHz by the mixing frequency $f_{M1}$=16 kHz, and is on the other hand down-mixed to 0 kHz (superheterodyne principle). In a corresponding manner, a 12 kHz pulse which is applied to the input of the first mixing stage is on the one hand up-mixed to 28 kHz, and is on the other hand down-mixed to 4 kHz, by the mixing frequency of 16 kHz. The low-pass filters 8 and 9 (TP1) have the task of filtering out the up-mixed frequency components and of allowing only the 0 kHz component of the 16 kHz pulse as well as the 4 kHz component of the 12 kHz pulse to pass. It is therefore worthwhile to define the cut-off frequency of the low-pass filters 8 and 9 (TP1) in the quadrature and in-phase path, respectively, to be 4.5 kHz. The low-pass filters 8 and 9 are followed by the decimation stages 10 and 11, which once again reduce the signal from $f_S$=32 kHz to $f_S$=16 kHz. The repeated reduction in the signal rate allows the further signal processing to be significantly simplified.

The following text is based on the assumption that the detection circuit for charge unit pulses has been set to identify 16 kHz pulses. In this case, there is no need to use a second mixing frequency to once again up-mix or down-mix the signals which are produced at the output of the decimation stages 10 and 11, because the 16 kHz pulses have already been down-mixed by the mixers 4 and 5 from 16 kHz to 0 kHz.

The mixer 12 is thus switched to be inactive, or multiplies every value applied to it by 1. The actual band limiting of the down-mixed signal is carried out by the low-pass filters 13 and 14 (TP2/TP3, TP2). The low-pass filters 13, 14 are used to define the intermediate frequency band within which AC voltage pulses are intended to be detected. If, for example, the cut-off frequency of the low-pass filters 13 and 14 is fixed at 0.5 kHz, then AC voltages at frequencies from −0.5 kHz to +0.5 kHz can pass through the low-pass filters. This corresponds to a permissible frequency band from 15.5 kHz to 16.5 kHz in the input signal. The calculation example shows that the permissible band range for AC voltage pulses to be detected can be defined in a simple manner by low-pass filtering the intermediate frequencies.

The sampling frequency is once again halved in the subsequent decimation stages 15 and 16 (from $f_S$=16 kHz to $f_S$=8 kHz), by omitting every alternate signal value. The signal values which then remain are supplied to the multipliers 17 and 18, which square each signal value. The adder 19 in each case forms the sum of the squares of the quadrature and in-phase signal values, and thus determines the square of the magnitude of the respective signal value, to be precise independently of the phase angle of the input signal. The threshold value decision device 20 compares the result supplied from the adder 19 with a predetermined threshold value. If this threshold value is exceeded, then the detection signal $y_{16}$ (k) from the threshold value decision device 20 indicates that a 16 kHz pulse has been received.

Charge unit pulses at a frequency of about 12 kHz are used in some European countries. If the circuit illustrated in the drawing FIGURE is intended to evaluate such 12 kHz pulses, then, in addition to the first mixing frequency of $f_{M1}$=16 kHz, a second mixing frequency of $f_{M2}$=4 kHz must also be used. For this purpose, the quadrature signal which is produced at the output of the decimation stage 10 and has been down-mixed by the mixer 4 to an intermediate frequency of 4 kHz is supplied to the mixers 12 and 21. The mixers 12 and 21 multiply the signal applied to them by the sine signal sequence and cosine signal sequence, respectively, for the mixing frequency $f_{M2}$=4 kHz.

Since the sampling frequency $f_S$ is in this case 16 kHz and is thus four times the mixing frequency, the cosine signal sequence once again becomes
1, 0, −1, 0, 1, . . .

$$\left(\cos\left(\frac{\pi \cdot k}{2}\right), \text{ where } k = 0, 1, 2, \ldots\right),$$

and the sine sequence becomes
0, 1, 0, −1, 0, . . .

$$\left(\sin\left(\frac{\pi \cdot k}{2}\right), \text{ where } k = 0, 1, 2, \ldots\right).$$

Multiplication by a mixing frequency signal at the frequency 4 kHz results in the intermediate frequency signal which is applied to the mixers 12 and 21 on the one hand being up-mixed to 8 kHz and on the other hand being down-mixed to 0 kHz. The low-pass filters 13 and 22 (TP2/TP3, TP3) which are arranged downstream in the signal path on the one hand eliminate the up-mixed 8 kHz component. On the other hand, with regard to the signal component which has been down-mixed to 0 kHz, the cut-off frequency of the low-pass filters 13 and 22 defines the permissible intermediate band range within which pulses are detected.

The downstream decimation stages 15 and 23 halve the signal rate from $f_S$=16 kHz to $f_S$=8 kHz by omitting every alternate sample value. The evaluation is carried out by the multipliers 17 and 24, by the adder 25 and by the threshold value decision device 26. If the sum of the squares of the signal values is greater than a predetermined threshold, then a 12 kHz pulse is present. This is indicated by the detection signal $y_{12}$(k) being produced at the output of the threshold value decision device 26.

We claim:

1. A circuit for detecting AC voltage pulses at a defined frequency, comprising:
   an analog/digital converter unit for converting an input signal to a sequence of sample values;
   at least one mixing stage for multiplying the sequence of sample values by a mixing frequency signal, said mixing stage having a quadrature signal path and an in-phase signal path;
   at least one low pass filter stage for defining a permissible intermediate frequency band and for obtaining converted sample values by filtering the sequence of sample values having been multiplied by the mixing frequency signal for suppressing an up-mixed component; and
   an evaluation unit for determining whether an AC voltage pulse is present by using the converted sample values, said evaluation unit squaring, adding and comparing the converted sample values in said quadrature signal path and in said in-phase signal path with a threshold value.

2. The circuit according to claim 1, further comprising at least one decimation stage for reducing a signal rate by omitting sample values.

3. The circuit according to claim 2, wherein:
   in said quadrature signal path the sequence of sample values is multiplied by a sine signal at the mixing frequency signal; and
   in said in-phase signal path the sequence of sample values is multiplied by a cosine signal at the mixing frequency signal.

4. The circuit according to claim 3, wherein in said quadrature signal path, the sequence of sample values is multiplied by the sine signal by multiplying the sequence of sample values by a sequence 0, 1, 0, −1, 0, . . . .

5. The circuit according to claim 3, wherein in said in-phase signal path, the sequence of sample values is multiplied by the cosine signal by multiplying the sequence of sample values by a sequence 1, 0, −1, 0, 1, . . . .

6. The circuit according to claim 1, wherein the mixing frequency signal of said mixing stage has a frequency corresponding to the frequency of the AC voltage pulses that will be detected.

7. The circuit according to claim 1, further comprising:
   a first mixing stage defining said mixing stage, said first mixing stage for multiplying the sequence of sample values by a first mixing frequency signal having a frequency corresponding to a frequency of a first type of AC voltage pulses; and
   a second mixing stage configured between said first mixing stage and said evaluation unit;
   said second mixing stage for multiplying the sequence of sample values by a second mixing frequency signal having a frequency corresponding to a difference frequency formed by a difference between the frequency of the first type of AC voltage pulses and a frequency of a second type of AC voltage pulses.

8. The circuit according to claim 7, further comprising: a lowpass filter stage having a cut-off frequency above the difference frequency; said low-pass filter stage configured between said first mixing stage and said second mixing stage.

9. The circuit according to claim 1, wherein the AC voltage pulse is a charge unit signal in a telephone network.

10. A telephone portion including a circuit for detecting charge unit signals at a defined frequency, the circuit comprising:

an analog/digital converter unit for converting an input signal to a sequence of sample values;

at least one mixing stage for multiplying the sequence of sample values by a mixing frequency signal;

at least one low pass filter stage for defining a permissible intermediate frequency band and for obtaining converted sample values by filtering the sequence of sample values having been multiplied by the mixing frequency signal for suppressing an up-mixed component;

an evaluation unit for determining whether a charge unit signal is present by using the converted sample values; and a speech path for performing audio signal processing, the charge unit signal being detected via said speech path.

11. The telephone portion according to claim 10, wherein:

said analog/digital converter unit is configured in the speech path; and the charge unit signals are digitized by said analog/digital converter unit.

12. The telephone portion according to claim 10, further comprising at least one digital signal processor for implementing at least said mixing stage and said filter stage.

13. A method for identifying different types of AC voltage pulses each having a defined frequency, the method which comprises:

digitizing an input signal to form a sequence of digitized sample values;

obtaining a sequence of converted sample values by converting the sequence of sample values using any desired sequence of steps including multiplying the sequence of sample values by predetermined mixing frequency signals and low pass filtering the sequence of sample values to define a permissible intermediate frequency band and for suppressing an up-mixed component; and using the sequence of converted sample values to determine whether a specific type of AC voltage pulse is present by squaring, adding and comparing the sequence of converted sample values with a threshold value.

14. The method according to claim 13, which further comprises, while performing the step of converting the sequence of sample values, reducing a signal rate by reducing a number of the sample values in the sequence of sample values.

15. The method according to claim 13, wherein the step of multiplying the sequence of sample values by predetermined mixing frequency signals includes multiplying the sequence of sample values by a mixing frequency signal having a frequency corresponding to a frequency of the AC voltage pulses being identified.

16. The method according to claim 13, wherein the step of multiplying the sequence of sample values by predetermined mixing frequency signals includes first multiplying the sequence of sample values by a first mixing frequency signal having a frequency corresponding to a frequency of a first type of AC voltage pulses, and subsequently multiplying the sequence of sample values by a second mixing frequency signal having a frequency corresponding to a difference between the frequency of the first type of AC voltage pulses and a frequency of a second type of AC voltage pulses.

17. The method according to claim 13, wherein the AC voltage pulses are charge unit signals in a telephone network.

* * * * *